Patented Mar. 29, 1938

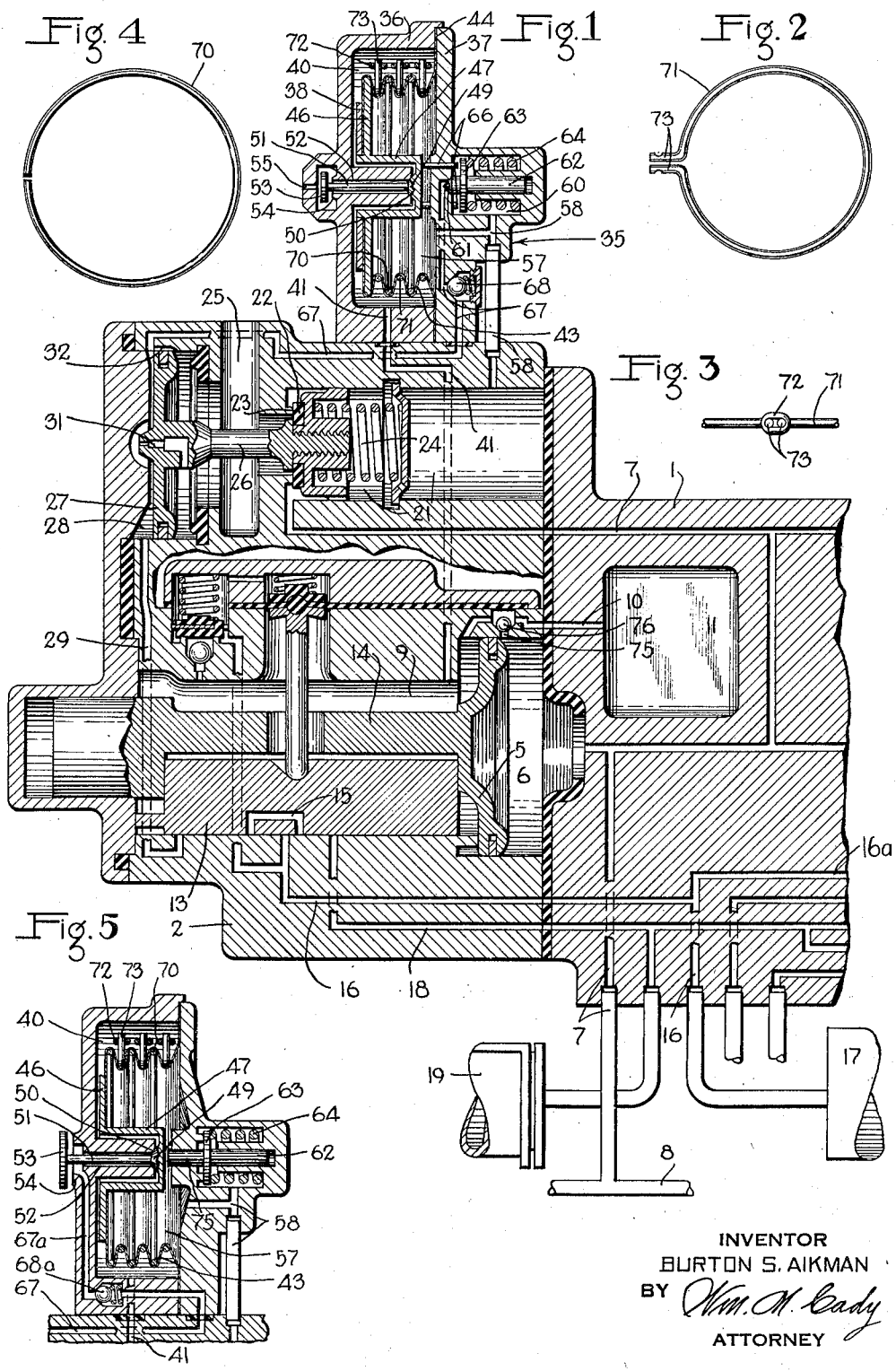

2,112,415

UNITED STATES PATENT OFFICE 2,112,415

FLUID PRESSURE BRAKE

Burton S. Aikman, Wilkinsburg, Pa., assignor to The Westinghouse Air Brake Company, Wilmerding, Pa., a corporation of Pennsylvania Application July 24, 1937, Serial No. 155,463

4 Claims. (Cl. 303—42)

This invention relates to fluid pressure brake equipment and more particularly to the type operative upon a reduction in the pressure of fluid in a brake pipe to effect an application of the brakes.

In the operation of a brake controlling valve device of the well known type disclosed in U. S. Patent 2,031,213 issued to Clyde C. Farmer on February 18, 1936, which is provided with a service portion and a separate emergency portion which is movable to an emergency position upon an emergency reduction in the brake pipe pressure for effecting an emergency application of the brakes, it is essential that undesired movement of the emergency portion to emergency position in response to a reduction in brake pipe pressure at a service rate be avoided.

It is the principal object of my invention to provide an auxiliary valve device of novel construction adapted to be associated with the emergency portion of a brake controlling valve device of the above type, which auxiliary device is operative to prevent movement of the emergency portion to emergency position in response to a service rate of reduction in brake pipe pressure and also to increase the sensitivity of the emergency portion to emergency reductions in brake pipe pressure.

In the accompanying drawing, Fig. 1 is a diagrammatic sectional view of the emergency portion of a brake controlling valve device embodying one form of my invention; Figs. 2, 3, and 4 are views of the reinforcing rings associated with the bellows diaphragm shown in Fig. 1; and Fig. 5 is a fragmentary sectional view illustrating another form of the invention.

Referring to Fig. 1, the portion of the brake controlling valve device shown comprises a pipe bracket 1 having secured thereto an emergency valve portion 2, which, although illustrated in simplified form, is adapted to function in the same manner as the emergency portion of the well known AB valve disclosed in the aforementioned patent. The emergency valve portion 2 is adapted to cooperate with a service valve portion, not shown, in effecting an emergency application of the brakes, it being understood that a service application of the brakes may be effected by independent operation of the usual service portion in response to a service reduction in brake pipe pressure.

The emergency portion 2 comprises an emergency piston 5 having on one side a piston chamber 6 which is connected through a passage and pipe 7 to the usual brake pipe 8, and on the other side a valve chamber 9 connected by way of a passage 10 to a quick action chamber 11, which piston is adapted to operate an emergency slide valve 13 through the medium of a stem 14. The emergency slide valve 13 has a cavity 15, which, when the slide valve is moved to emergency position as hereinafter explained, is adapted to establish communication between a passage 16 which is connected to an emergency reservoir 17 and a passage 18 that is connected to the usual brake cylinder 19.

The passage 7 communicating with the brake pipe 8 is also connected to a valve chamber 21 containing a brake pipe vent valve 22 which is normally held in engagement with a seat 23 by the force of a spring 24. The vent valve 22 is adapted to control communication from the valve chamber 21 to an atmospheric exhaust passage 25 and is operatively connected through the medium of a stem 26 to a piston 27, which has on one side a chamber 28 which is connected to a passage 29 leading to the seat of the slide valve 13. The piston 27 is provided with a restricted timing port 31 connecting the chamber 28 to the atmospheric exhaust passage 25, the chamber 28 and the exhaust passage being also connected by way of a leakage groove 32 formed in the casing while the piston is in its normal position as shown in the drawing.

According to the invention, an auxiliary valve device 35 is provided for controlling the operation of the emergency valve portion 2, which device comprises a casing section 36 and a casing section 37 secured together by any suitable means, not shown, and forming a chamber 40 which communicates by way of a passage 41 with the emergency valve chamber 9. Disposed in the chamber 40 is a flexible bellows diaphragm 43, which may be made of metal, or if preferred, of a suitable non-metallic resilient material such as rubber. One end of the diaphragm 43 is provided with an annular flange 44 which is interposed between the casing sections 36 and 37, and the other end of the diaphragm has secured thereto as by means of a clamping ring 38, a disk element 46 having a central sleeve portion 47 which extends back into the bellows diaphragm.

Formed within the sleeve portion 47 is a valve 49, which is adapted to be normally held in engagement with a seat provided on a projecting portion of the casing section 36, and which valve has a stem 51 extending through a bore 52 and terminating in a valve head 53 that is adapted to engage a seat 54 for controlling communication from the bore 52 to an atmospheric exhaust passage 55 formed in the casing section 36. The stem 51 is of such a length that, with the valve 49 held in engagement with the seat 50 by the inherent force of the resilient diaphragm 43 the valve head 53 is maintained in unseated position as shown in the drawing, while upon slight movement of the valve 49 away from its seat in the manner hereinafter explained, the valve head 53 will still remain unseated to permit communication from the chamber 40 through the bore 52 and the passage 55 to the atmosphere.

Formed within the bellows diaphragm 43 is a chamber 57 communicating through a passage and pipe 58 with the vent valve chamber 21 and consequently with the brake pipe 8 which is connected to chamber 21 through passage 7, the passage 58 being also in communication with a valve chamber 60 formed in the casing section 37 of the auxiliary valve device 35. Contained in the valve chamber 60 is a valve 61 having a stem 62 slidably mounted in a suitable bore in the casing section, the valve stem being provided with a collar 63 adapted to be engaged by a coil spring 64 provided for urging the valve 61 into seated position. Two or more pins 66 are secured to the end of the sleeve portion 47 within the chamber 57 and extend through suitable bores formed in the casing section 37 into the valve chamber 60, the ends of said pins being operatively aligned with the collar 63 on the valve stem 62.

The valve 61 controls communication from the valve chamber 60 through a passage 67 to the piston chamber 28 adjacent the vent valve piston 27 in the emergency valve portion. A ball check valve 68 is interposed in the passage 67 for preventing back flow of fluid under pressure from the piston chamber 28 to the valve chamber 60.

In order to insure against possible collapse or rupture of the bellows diaphragm 43 due to variations in the high pressures of fluid acting on opposite sides thereof, the diaphragm is provided with reinforcing means comprising expansion ring members 70 fitted within the interior corrugations of the bellows diaphragm, and annular members 71 secured in the exterior corrugations of the diaphragm by means of links 72 fitted over the adjacent outwardly turned ends 73, as best shown in Figs. 2 and 3 of the drawing. The members 70 and 71 are thus adapted to afford the desired strengthening of the bellows diaphragm 43 without in any way interfering with the normal operation thereof, as hereinafter explained.

In initially charging the equipment, fluid under pressure supplied in the usual manner to the brake pipe 8 flows therefrom by way of the pipe and passage 7 to the emergency piston chamber 6, and with the piston 5 and the emergency slide valve 13 in release position as shown in Fig. 1, fluid under pressure is supplied from the chamber 6 through a feed port 75 and past a ball check valve 76 to the passage 10, and thence to the valve chamber 9 and the quick action chamber 11. It will be understood that the passage 7 in the pipe bracket 1 also leads to the service portion of the brake controlling valve device, not shown, which is charged in the usual manner with fluid under pressure and acts to supply fluid under pressure to the emergency reservoir 17 by way of a passage 16a and the passage 16.

Fluid under pressure is also supplied from the brake pipe 8 through the passage 7 to the emergency vent valve chamber 21, and thence through the pipe and passage 58 to the valve chamber 60 and to the chamber 57 within the bellows diaphragm 43. At the same time, fluid at brake pipe pressure is supplied from the emergency valve chamber 9 by way of the passage 41 to the chamber 40 surrounding the bellows diaphragm 43, and with the fluid pressures on opposite sides thereof thus equalized, the diaphragm remains effective to maintain the valve 49 seated and the valve 53 unseated as shown in the drawing.

If the pressure of fluid in the brake pipe 8 is now reduced at a service rate for effecting a service application of the brakes, a similar reduction in pressure is at the same time effected in the diaphragm chamber 57 in the auxiliary valve device which is connected with the brake pipe through the communications already described, and the bellows diaphragm 43 is then operated by the fluid pressure in the chamber 40 to move the element 46 to the right until the pins 66 engage the collar 63 which is subject to the biasing force of the spring 64. As the diaphragm 57 and element 46 are thus operated the valve 49 is moved away from seat 50, and since the corresponding movement of the stem 51 and the valve pin 53 is at this time insufficient to bring the valve head into engagement with the seat 54, fluid under pressure is permitted to flow from the quick action chamber 11 and the emergency valve chamber 9 to the atmosphere by way of the passage 41, the chamber 40, past the unseated valves 49 and 53 and through the exhaust passage 55.

This venting of fluid under pressure from the emergency valve chamber 9 prevents the establishment of a sufficient differential pressure on the emergency piston 5 as a result the service rate of reduction in brake pipe pressure to cause movement of the piston and of the emergency slide valve 13 from the release position shown in Fig. 1, while the corresponding reduction in fluid pressure in the chamber 40 of the auxiliary valve device 35 avoids any possibility of excessive movement of the diaphragm 57 in response to a service rate of reduction in brake pipe pressure, so that the valve 51 is held seated by the pressure of the spring 64.

It will be understood that the service portion, not shown, of the brake controlling device meanwhile operates in the usual manner upon the reduction in brake pipe pressure to supply fluid under pressure to the brake cylinder 19 for effecting a service application of the brakes.

When the pressure of fluid in the chamber 40 of the auxiliary valve device 35 has been reduced sufficiently with respect to the opposing pressure of fluid in the diaphragm chamber 57, the bellows diaphragm 57 moves the valve 49 into engagement with the seat 50 to cut off further flow of fluid under pressure from the connected chambers 11, 9 and 40, this movement of the diaphragm being caused by its inherent resiliency.

If it is desired to effect an emergency application of the brakes, the pressure of fluid in the brake pipe 8 is reduced at an emergency rate in the usual manner, the corresponding reduction in fluid pressure in the diaphragm chamber 57 of auxiliary valve device being such as is to cause the diaphragm 43 to move the element 46 toward the right-hand under the pressure of fluid in the chamber 40, the pins 66 being this time brought into engagement with the collar 63 of the valve 51 with sufficient force to overcome the pressure of spring 64 so as to move the valve 61 away from its seat. At the same time the valve head 53 on the stem 51 is moved into engagement with the seat 54 for cutting off communication between the bore 52 and the atmospheric passage 55.

With the valve 61 unseated as a result of the emergency reduction in brake pipe pressure, fluid under pressure is supplied from the brake pipe 8 by way of the pipe and passage 7, the valve chamber 21, the pipe and passage 58, through the passage 67 and past the check valve 68, and thence to the piston chamber 28. Fluid under pressure is thus supplied to the piston chamber 28 at a faster rate than fluid can flow through the restricted port 31, so that the piston 27 is shifted towards the right-hand, thereby moving the brake pipe vent valve 22 away from the seat 23 for establishing communication from the chamber 21 through the passage 25 to the atmosphere. Fluid under pressure is then vented from the brake pipe at a rapid rate for insuring quick serial action of the brake controlling valve devices throughout the train.

The emergency reduction in the pressure of fluid in the brake pipe 8 and consequently in the piston chamber 6 of the emergency valve portion also results in the operation of the emergency piston 5 by the pressure of fluid at quick action chamber pressure in the valve chamber 5, the piston being moved towards the right-hand so as to shift the emergency slide valve 13 into its emergency position, wherein the cavity 15 establishes communication between the passages 18 and 16. Fluid under pressure is thereby supplied from the emergency reservoir 17 through the passage 16, the cavity 15, and the passage 18 to the brake cylinder 19 for effecting an emergency application of the brakes. At the same time, the emergency slide valve 13 in moving into the emergency position uncovers the passage 29, so that fluid under pressure is supplied from the valve chamber 9 through the passage 29 to the piston chamber 28, thereby insuring that the vent valve 22 will be held in the unseated position long enough to effect the desired venting of fluid under pressure from the brake pipe.

Since the fluid at quick action chamber pressure in the chamber 40 of the auxiliary valve device is slowly vented through the passage 41, the valve chamber 9, the passage 29, and through the restricted port 31 in the vent valve piston 27 to the atmospheric exhaust passage 25, the opposing fluid pressures acting on the bellows diaphragm 57 finally become substantially equalized and the spring 64 is consequently permitted to move the valve 61 into seated position while the diaphragm returns to its normal position as shown in Fig. 1.

The modified form of my invention illustrated in Fig. 5 is in general operative upon the same principle as is the auxiliary valve device 35 shown in Fig. 1 of the drawing, and comprises the bellows diaphragm 43 subject to the opposing pressures of the fluid supplied from the brake pipe in the chamber 57 and of fluid from the quick action chamber in the chamber 40, the diaphragm being adapted to control a pair of valves 49 and 53. As shown in Fig. 5, however, the stem 62 carrying the collar 63 which is biased towards the left hand by the spring 64 is provided with a projecting portion 75, which extends into the chamber 57 and is adapted to be engaged by the sleeve portion 47 of the element 46. It will also be noted that the bore 32 through which the valve stem 51 extends communicates through a passage 67a and past a ball check valve 68a with the passage 67.

In operation, when a service reduction in brake pipe pressure is effected, the resultant reduction in fluid pressure in diaphragm chamber 57 permits the pressure of fluid in the chamber 40 to move the diaphragm 43 to the service position, wherein the portion 47 engages the stem portion 75 while the valve 50 is moved away from the seat to permit venting of fluid under pressure from the chamber 40 at a service rate past the valve 50 through the bore 52 and past the still unseated valve 53 to the atmosphere. This venting of fluid under pressure from the quick action chamber and the emergency valve chamber by way of the chamber 40 is effective to prevent emergency operation of the emergency valve device, as will be understood from an explanation presented in connection with the operation shown in Fig. 1.

If it is desired to effect an emergency application of the brakes, and the pressure of fluid in the brake pipe and in the connected valve chamber 57 is accordingly reduced at an emergency rate, the diaphragm 43 is quickly operated to move the element 46 toward the right-hand, overcoming the force of the spring 64 upon engagement of the portion 47 with the stem 75, while unseating the valve 49 and moving the valve head 53 into seating engagement with the seat 54.

With the valve 49 unseated and the valve head 53 in seated position, fluid under pressure is supplied from the connected quick action chamber and emergency valve chamber by way of the passage 41, the chamber 40 in the auxiliary control device, past the valve 49, and through the bore 52, the passage 67a, past the ball check valve 68 and through the passage 67 to the brake pipe vent valve piston chamber for unseating the vent valve. As hereinbefore explained, the emergency reduction in the pressure of fluid in the brake pipe is at the same time effective to cause operation of the emergency valve portion to effect an emergency application of the brakes.

It will thus be apparent that according to my invention there is provided an auxiliary control valve mechanism which is cooperative with the emergency portion of a brake controlling valve device for preventing an undesired emergency application of the brakes, which mechanism comprises valve means of novel construction adapted to be operated by a sensitive bellows diaphragm having reinforcing means associated therewith for preventing collapse or failure of the diaphragm without interfering with its desired movement in an axial direction.

While two illustrative embodiments of the invention have been described in detail it is not my intention to limit its scope to those embodiments or otherwise than by the terms of the appended claims.

Having now described my invention, what I claim as new and desire to secure by Letters Patent, is:

1. In a fluid pressure brake, in combination, a normally charged brake pipe, a normally charged quick action chamber, emergency valve means subject to the opposing pressures of fluid in said brake pipe and in said chamber, said emergency valve means being movable upon an emergency reduction in brake pipe pressure from a release position to an emergency position for effecting an emergency application of the brakes, vent valve means responsive to an increase in fluid pressure to vent fluid at an emergency rate from the brake pipe, a movable abutment subject to the opposing pressures of fluid in said quick action chamber and in said brake pipe, a valve operative by said abutment upon a service rate of reduction in brake pipe pressure to effect a reduction in fluid pressure in said quick action chamber at a service rate, and another valve operative by said abutment upon an emergency reduction in brake pipe pressure for supplying fluid under pressure from said brake pipe to said vent valve means.

2. In a fluid pressure brake, in combination, a normally charged brake pipe, a normally charged quick action chamber, emergency valve means subject to the opposing pressures of fluid in said brake pipe and in said chamber, said emergency valve means being movable upon an emergency reduction in brake pipe pressure from a release position to an emergency position for effecting an emergency application of the brakes, brake pipe vent valve means operative on an increase in fluid pressure to effect an emergency reduction in brake pipe pressure, and an auxiliary valve device for controlling said emergency valve means, comprising a diaphragm subject to the opposing pressures of fluid in said brake pipe and in said quick action chamber, a normally closed valve operative by said diaphragm upon both service and emergency reductions in brake pipe pressure to establish communication from said quick action chamber to a passage leading in one direction to the atmosphere and in another direction to said brake pipe vent valve means, and a normally open valve adapted to be seated by said diaphragm only upon an emergency reduction in brake pipe pressure to cut off the atmospheric connection of said passage, whereby upon a service reduction in brake pipe pressure fluid under pressure is vented from said quick action chamber to atmosphere at a service rate and upon an emergency reduction in brake pipe pressure fluid is supplied from said quick action chamber at a pressure sufficient to operate said brake pipe vent valve means.

3. In a fluid pressure brake, in combination, a normally charged brake pipe, a normally charged quick action chamber, emergency valve means subject to the opposing pressures of fluid in said brake pipe and in said chamber, said emergency valve means being movable upon an emergency reduction in brake pipe pressure from a release position to an emergency position for effecting an emergency application of the brakes, brake pipe vent valve means operative on an increase in fluid pressure to discharge fluid under pressure from the brake pipe, and an auxiliary valve device for controlling said emergency valve means, comprising a diaphragm subject to the opposing pressures of fluid in said brake pipe, and in said quick action chamber, a valve carried by said diaphragm and normally closing a communication through which fluid is vented from the quick action chamber, said valve being operative by said diaphragm upon a service rate of reduction in brake pipe pressure for opening said communication, a second valve operable by said diaphragm upon an emergency rate of reduction in brake pipe pressure for closing said communication, and a third valve operative by said diaphragm upon a reduction in brake pipe pressure at an emergency rate for supplying fluid under pressure to said brake pipe vent valve means.

4. In a fluid pressure brake, in combination, a normally charged brake pipe, a normally charged quick action chamber, emergency valve means subject to the opposing pressures of fluid in said brake pipe and in said chamber, said emergency valve means being movable upon an emergency reduction in brake pipe pressure from a release position to an emergency position for effecting an emergency application of the brakes, brake pipe vent valve means operative on an increase in fluid pressure to discharge fluid under pressure from the brake pipe, and an auxiliary valve device for controlling said emergency valve means, comprising a diaphragm subject to the opposing pressures of fluid in said brake pipe, and in said quick action chamber, a valve carried by said diaphragm and normally closing a communication through which fluid is vented from the quick action chamber, said valve being operative by said diaphragm upon a service rate of reduction in brake pipe pressure for opening said communication, a second valve operable by said diaphragm upon an emergency rate of reduction in brake pipe pressure for closing said communication, a third valve operative by said diaphragm upon a reduction in brake pipe pressure at an emergency rate for supplying fluid under pressure to said brake pipe vent valve means, and a spring for opposing movement of said third valve and thereby said diaphragm to emergency position upon a reduction in brake pipe pressure at a service rate.

BURTON S. AIKMAN.